Sept. 26, 1961 A. HASBROUCK 3,001,726
MANIFOLD ATTACHMENT
Filed June 23, 1959
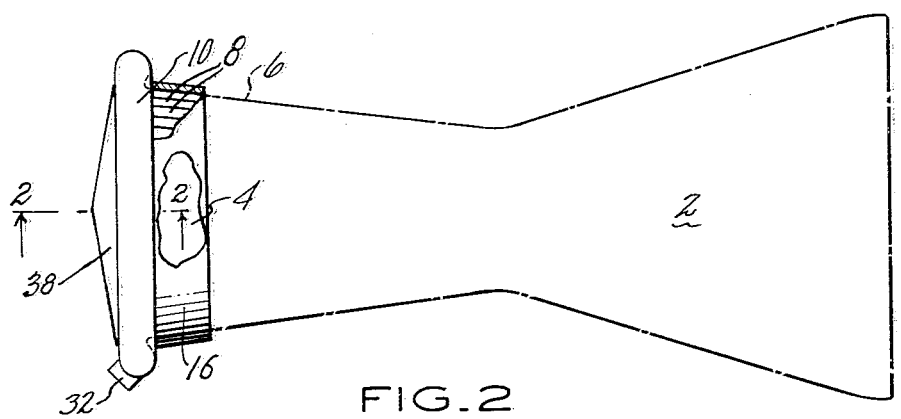
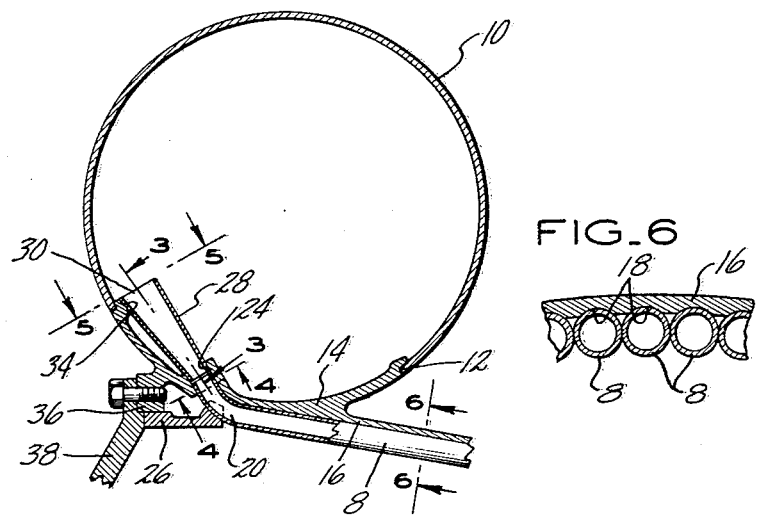
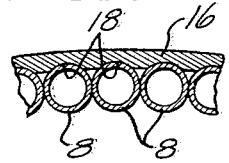
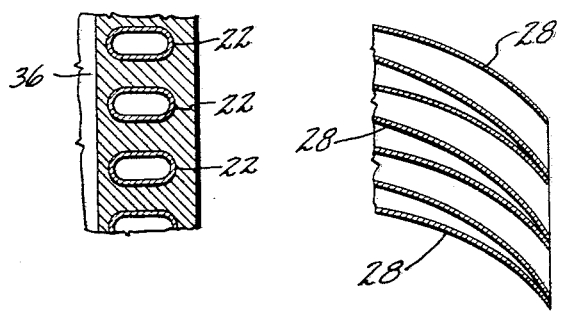
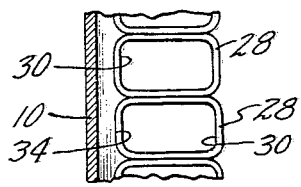
INVENTOR
AUGUSTUS HASBROUCK
BY
ATTORNEY 3,001,726
MANIFOLD ATTACHMENT
Augustus Hasbrouck, Middletown, Conn., assignor to United Aircraft Corporation, East Hartford, Conn., a corporation of Delaware
Filed June 23, 1959, Ser. No. 822,379
7 Claims. (Cl. 239—468)

This invention relates to an attachment by which a number of tubes are connected to a collector.

An arrangement of this character may be used, for example, where a large collector receives fluid from a plurality of smaller tubes or ducts. An arrangement of this type has particular utility in rocket chambers or nozzles in which tubes forming the chamber or nozzle wall discharge cooling fluid therefrom into a manifold having a substantially larger volume. One feature of the invention is the minimizing of the pressure loss otherwise resulting from the discharge from the tubes directly into the collector. Another feature is the diffusing of the fluid to reduce its velocity and increase its pressure as it enters the collector.

One feature of the invention is a mounting arrangement by which a plurality of tubes may be connected to a collector with an arrangement of diffusing structures cooperating with said mounting to reduce the pressure loss as fluid from the tubes is discharged into the collector.

Other features and advantages will be apparent from the specification and claims, and from the accompanying drawing which illustrates an embodiment of the invention.

FIG. 1 is an elevation of a rocket embodying the invention.

FIG. 2 is a fragmentary sectional view along line 2—2 of FIG. 1 showing on a larger scale the connection of the tubes to the manifold or collector.

FIG. 3 is a sectional view substantially along the line 3—3 of FIG. 2.

FIG. 4 is a sectional view substantially along the line 4—4 of FIG. 2.

FIG. 5 is a view substantially along the line 5—5 of FIG. 2.

FIG. 6 is a sectional view along the line 6—6 of FIG. 2.

The rocket includes a nozzle 2 and a combustion chamber 4 with the wall 6 of the combustion chamber made up of a large number of tubes 8 in closely spaced relation, as shown in FIG. 6. These tubes all deliver coolant therefrom into the manifold or collector 10 which extends around the periphery of the rocket chamber. The manifold or collector 10 is in the form of an annulus with a longitudinally extending slot 12 therein to receive the mounting 14 by which the tubes may be attached to the manifold. This mounting includes a tangentially extending portion 16, FIG. 6, forming a saddle for the tubes 8, the saddle preferably having grooves 18 in which the tubes rest. The tubes 8 all extend substantially tangentially of the manifold and at substantially the same angle to the axis of the manifold.

Each of the tubes 8 at its discharge end is bent as at 20 and is also formed into an elongated cross-sectional shape 22, as shown in FIG. 4, such that the tubes at this point will be spaced circumferentially of the rocket chamber. The mounting 14 has a plurality of elongated openings 24 formed therein with these openings corresponding in shape and dimension to the elongated ends of the tubes and similarly spaced apart so that the ends of the several tubes may be positioned in these openings and suitably brazed or otherwise permanently attached therein. A clamp 26 may then be positioned to engage with the tubes at the bend therein to assist in retaining the tubes in position within the slots 24.

In the inner ends of each of the openings 24 is positioned the upstream end of a diffuser element 28, the latter of necessity being at its upstream end, the same shape as the tube ends 22 and of the opening 24. Each diffuser element 28 increases in dimension in a direction radially of the manifold and also in a direction circumferentially of the manifold to the open end 30 of the element. At this point the adjacent diffuser elements are in contact circumferentially of the manifold. These diffuser elements reduce the velocity and increase the pressure of the fluid discharging from the tubes 8 thereby effectively minimizing the pressure losses as the fluid enters the manifold.

In addition to diffusing the flow from the tubes 8 the diffuser elements 28 may also be curved from end to end, as shown in FIG. 3, so that the fluid flow into the manifold is turned to flow circumferentially through the manifold thereby further reducing the pressure losses that would otherwise result from the necessity for the fluids to turn within the manifold in order to reach outlet 32.

The diffuser elements 28 in addition to being supported within the openings 24 may be supported adjacent their downstream ends by an edge portion 34 of the mounting 14. With the diffuser elements brazed at this point and also in the openings 24 these elements will be securely held during operation of the device. The mounting 14 may also have a projecting flange 36 to which the end cap 38 for the rocket chamber is attached.

It is to be understood that the invention is not limited to the specific embodiment herein illustrated and described, but may be used in other ways without departure from its spirit as defined by the following claims.

I claim:

1. An attachment for connecting a plurality of tubes to a collector extending transversely of the tubes with the tubes in closely arranged side-by-side relation and all extending at substantially the same angle to the collector, said attachment including a mounting forming a section of the collector wall and having a row of openings therein to receive the ends of the tubes, the axis of each of said openings making a relatively small angle with the wall of the collector, and diffuser elements within the collector and forming extensions of said openings.

2. An attachment as in claim 1 in which a clamp is attached to said mounting externally of the collector for clamping the tubes in position.

3. An attachment as in claim 1 in which the mounting externally of the openings has saddles to receive the tubes and clamping means carried by the mounting and engaging said tubes.

4. An attachment as in claim 1 in which the diffuser elements extend substantially tangentially of the wall of the collector.

5. An attachment as in claim 1 in which the row of openings in the mounting are spaced apart and are elongated in a direction radially of the collector to receive the ends of the tubes, the later being similarly shaped in cross section.

6. In an attachment for connecting a plurality of tubes to a collector extending transversely of the tubes, said tubes being in side by side relation and extending at substantially the same angle to the collector, a bent and flattened portion in each tube at the connection to the collector, a mounting forming a section of the collector wall and having a plurality of openings therein to receive the ends of the tubes, saddles in said mounting to receive the tubes, said tubes being attached to the walls of said openings, diffuser elements within the collector and attached to said openings to communicate with said tubes, and means for clamping said tubes to said mounting.

7. An attached as in claim 1 in which the diffuser elements are curved from end to end circumferentially of the collector.

(References on following page)

References Cited in the file of this patent

UNITED STATES PATENTS

| | | |
|---|---|---|
| 1,522,120 | Halder | Jan. 6, 1925 |
| 1,789,427 | Delling et al. | Jan. 20, 1931 |
| 1,803,772 | Schellens et al. | May 5, 1931 |
| 2,880,577 | Halford et al. | Apr. 7, 1959 |

FOREIGN PATENTS

| | | |
|---|---|---|
| 1,106,338 | France | July 20, 1955 |

OTHER REFERENCES

"Mechanical Engineering Practice" by Shoop and Tuve; fifth edition; copyright 1956 by McGraw-Hill Book Company, Incorporated, New York, pages 260–264 relied on.